(12) United States Patent
Trautwein et al.

(10) Patent No.: US 12,151,554 B2
(45) Date of Patent: Nov. 26, 2024

(54) DIFFERENTIAL AND DRIVE SYSTEM FOR A VEHICLE

(71) Applicant: Robert Bosch GmbH, Stuttgart (DE)

(72) Inventors: Felix Trautwein, Schlaitdorf (DE);
Simon Peter, Weil der Stadt (DE);
Tobias Loss, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/554,847

(22) PCT Filed: Jun. 10, 2022

(86) PCT No.: PCT/EP2022/065908
§ 371 (c)(1),
(2) Date: Oct. 11, 2023

(87) PCT Pub. No.: WO2022/268538
PCT Pub. Date: Dec. 29, 2022

(65) Prior Publication Data
US 2024/0190243 A1 Jun. 13, 2024

(30) Foreign Application Priority Data
Jun. 25, 2021 (DE) ...................... 10 2021 206 624.0

(51) Int. Cl.
*F16H 48/20* (2012.01)
*B60K 23/04* (2006.01)
*F16H 48/28* (2012.01)

(52) U.S. Cl.
CPC ............ *B60K 23/04* (2013.01); *F16H 48/28* (2013.01); *B60K 2023/046* (2013.01); *F16H 2048/208* (2013.01)

(58) Field of Classification Search
CPC ... B60K 23/04; B60K 2023/046; F16H 48/28; F16H 2048/208
See application file for complete search history.

(56) References Cited

U.S. PATENT DOCUMENTS 3,304,806 A * 2/1967 Adams .................... F16H 48/16
475/232
3,517,573 A 6/1970 Roper
(Continued)

FOREIGN PATENT DOCUMENTS

DE 3535339 C2 3/1989
DE 3703780 C2 * 10/1989
(Continued)

OTHER PUBLICATIONS

International Search Report for PCT/EP2022/065908, Issued Sep. 14, 2022.

*Primary Examiner* — Justin Holmes
(74) *Attorney, Agent, or Firm* — NORTON ROSE FULBRIGHT US LLP; Gerard A. Messina

(57) ABSTRACT

A differential for a vehicle. The differential includes a cage, which is rotatable about a first axis of rotation and has a drive interface, a first driven gear, mounted in the cage to be rotatable about the first axis of rotation, a second driven gear, mounted in the cage to be rotatable about the first axis of rotation, a compensating gear, which is mounted in the cage about a second axis of rotation extending perpendicularly to the first axis of rotation and meshes with the first and the second driven gear, a flywheel mass, coupled to the cage and locked against rotation with respect to the first axis of rotation and displaceable in a radial direction perpendicularly to the first axis of rotation, and a clutch, which, as a result of an outward movement of the flywheel mass in the radial direction, is movable into a locking state.

11 Claims, 4 Drawing Sheets

(56) References Cited

U.S. PATENT DOCUMENTS 4,838,120 A 6/1989 Okada et al.
2001/0021680 A1 9/2001 Okada

FOREIGN PATENT DOCUMENTS

| DE | 102015210928 A1 | | 12/2016 | |
|----|----|----|----|----|
| DE | 102018221473 A1 | | 6/2020 | |
| DE | 102019202600 A1 | | 8/2020 | |
| DE | 102019115918 A1 | | 12/2020 | |
| SU | 1750993 A1 | * | 7/1992 | |
| WO | WO-2019077049 A1 | * | 4/2019 | ............... B60K 1/00 |

* cited by examiner (Detail Z:)

DIFFERENTIAL AND DRIVE SYSTEM FOR A VEHICLE

FIELD

The present invention relates to a differential and a drive system for a vehicle.

BACKGROUND INFORMATION

Differentials of vehicles are designed to distribute a torque generated by an axle-central drive device to two wheels and to thereby enable different rotational speeds of the wheels, e.g., when cornering. In vehicles, such as cars, open or non-locking differentials are typically used, which are designed to distribute the torque evenly to both wheels. If situations arise in which an uneven torque distribution to the wheels is desired, e.g., when moving off on a road which is slippery on one side, a wheel brake conventionally brakes the wheel which is in contact with the part of the road with a low friction coefficient in order to increase the torque which can be applied there. As a result, a higher torque can also be applied to the wheel with a higher friction coefficient.

In modern vehicles, electric machines are increasingly used as axle-central drive devices. The electric machine may conventionally also be operated as a generator in order to carry out braking. In such drive systems, the wheel brake may essentially be omitted, which makes an uneven torque distribution via the differential more difficult.

U.S. Pat. No. 3,517,573 A describes a differential having a cage, which is rotatable about a first axis of rotation, two driven gears, which are mounted in the cage to be rotatable about the first axis of rotation, and a compensating gear, which is mounted in the cage to be rotatable about a second axis of rotation and meshes with the driven gears. A crown gear is coupled to one of the driven gears and meshes with a spur gear rotatably mounted in the cage. The spur gear is coupled to a flywheel mass, which is in turn coupled to a friction member. In the case of a high differential speed between the cage and the driven gear, the spur gear rotates at high speed and, as a result of the centrifugal force, the flywheel mass is moved radially outwards from the axis of rotation of the spur gear. As a result, the flywheel mass actuates a clutch, which couples the driven gear to the cage.

SUMMARY

According to the present invention, a differential and a drive system are provided.

According to a first aspect of the present invention, a differential for a vehicle is provided. According to an example embodiment of the present invention, the differential includes a cage, which is rotatable about a first axis of rotation and has a drive interface for coupling to a drive, a first driven gear, which is mounted in the cage to be rotatable about the first axis of rotation, a second driven gear, which is mounted in the cage to be rotatable about the first axis of rotation, a compensating gear, which is mounted in the cage about a second axis of rotation extending perpendicularly to the first axis of rotation and meshes with the first and the second driven gear, a flywheel mass, which is coupled to the cage so as to be locked against rotation with respect to the first axis of rotation and displaceable in a radial direction perpendicularly to the first axis of rotation, and a clutch, which, as a result of an outward movement of the flywheel mass in the radial direction, is movable into a locking state in which it couples the compensating gear to the cage in a rotationally fixed manner with respect to the second axis of rotation or couples one of the driven gears to the cage in a rotationally fixed manner with respect to the first axis of rotation.

According to a second aspect of the present invention, a drive system for a vehicle comprises a drive motor, in particular in the form of an electric machine, a transmission gearing coupled to the drive motor, a differential according to the first aspect of the present invention, the cage being coupled to the transmission gearing by its drive interface, e.g., via a drive gear, such as a spur or crown gear, a first axle, which is connected to the first driven gear of the differential, and a second axle, which is connected to the second driven gear of the differential.

One feature on which the present invention is based consists in setting a locking level of the differential depending on the rotational speed of the cage. A flywheel mass is therefore mounted on the cage to be displaceable in a radial direction, i.e., perpendicularly to the first axis of rotation about which the cage is rotatable. At a high rotational speed of the cage, the flywheel mass is moved radially outwards, i.e., away from the first axis of rotation, optionally in opposition to a pretensioning force applied to the flywheel mass by a spring. As a result, the flywheel mass actuates a clutch or moves this from an open state into a locking state, in which the clutch couples the compensating gear or one of the driven gears to the cage so as to be locked against rotation, e.g., via friction fit.

In the locking state, a locking level is 100 percent. This means that a rotation of the driven gears relative to each other or relative to the cage is not possible. In the open state, the locking level is 0 percent, meaning that the driven gears may rotate relative to each other, as in the case of an open differential.

According to an example embodiment of the preset invention, coupling the flywheel mass to the cage in such a way that it is movable outwards in the radial direction as a result of a rotation of the cage about the first axis of rotation offers the advantage that the differential achieves a high locking level at high rotational speeds of the cage, whilst the locking level is low at low rotational speeds of the cage. At low rotational speeds, i.e., typically at low driving speeds, the differential therefore behaves like an open differential, which is favorable for tight turning radii or similar driving maneuvers. At high rotational speeds of the cage, i.e., at a high driving speed or with a high rotational speed difference between the driven gears, a high locking level of the differential is achieved.

This is, for example, favorable for cornering at high speed since it achieves a stabilizing effect on the vehicle, or when moving off on a road which is slippery on one side.

Advantageous configurations and developments of the present invention are disclosed herein.

According to some specific embodiments of the present invention, it may be provided that the clutch is designed to couple the compensating gear to the cage in a rotationally fixed manner with respect to the second axis of rotation in the locking state, the compensating gear being mounted on the cage via a bearing pin so as to be rotatable about the second axis of rotation, which bearing pin projects through a circumferential wall of the cage, the clutch having a multiplicity of first disks, which are coupled to the bearing pin in a rotationally fixed manner, and a multiplicity of second disks, which overlap with the first disks and are coupled to a disk carrier connected to the cage in a rotationally fixed manner with respect to the second axis of rotation, and the flywheel mass being coupled to the first or the second disks in order to move the first and the second disks relative to each other along the second axis of rotation and into meshing contact. Accordingly, the clutch is arranged on the radially outer side of the cage and is designed as a multiple disk clutch. A structurally simple and cost-effective design with a low spatial requirement is therefore advantageously realized. The disk carrier may be connected to the cage in a fixed manner, for example, or in turn mounted on the cage to be linearly displaceable in the radial direction. In the latter case, the disk carrier forms part of the flywheel mass, whereby an even more compact design can be realized.

According to some specific embodiments of the present invention, the flywheel mass may be connected to the disk carrier, in particular fastened thereto. By way of example, the flywheel mass may form, or be connected to, a cover of the disk carrier, which is positioned facing away from the cage in the radial direction.

According to some specific embodiments of the present invention, it may be provided that the disk carrier is formed by a clutch housing, which defines an internal space, the first and the second disks being arranged in the internal space. The disks are therefore better protected against contamination.

According to some specific embodiments of the present invention, it may be provided that the internal space is filled with a fluid, e.g., with a dilatant fluid. The clutch housing may therefore be designed to be fluid-tight and the clutch may be realized as a wet-running multiple disk clutch. This is advantageous in terms of the cooling of the disks. Furthermore, as a result of flooding the internal space with fluid, viscous friction between the disks also occurs in the open state of the clutch so that the locking level of the differential is additionally dependent on the speed difference between the gears.

According to some specific embodiments of the present invention, it may be provided that the clutch is designed to couple one of the driven gears to the cage in a rotationally fixed manner with respect to the first axis of rotation in the locking state, the respective driven gear being mounted on the cage via a driven shaft so as to be rotatable about the first axis of rotation, which driven shaft projects through an end wall of the cage, the clutch having a first friction arrangement, which is coupled to the driven shaft in a rotationally fixed manner with respect to the first axis of rotation, and a second friction arrangement, which is coupled to the cage in a rotationally fixed manner with respect to the first axis of rotation, the flywheel mass being coupled to the first or the second friction arrangement in such a way as to move these relative to each other into meshing contact. Accordingly, the clutch is arranged at an axial end of the cage, whereby a more compact design of the differential with respect to the radial direction is advantageously realized. The clutch is furthermore realized as a friction clutch, whereby, depending on the rotational speed of the cage and the resultant centrifugal force of the flywheel mass, substantially continuously variable locking levels can be set.

According to some specific embodiments of the present invention, it may be provided that the first friction arrangement has a multiplicity of first disks, which are coupled to the driven shaft in a rotationally fixed manner, that the second friction arrangement has a multiplicity of second disks, which overlap with the first disks and are coupled to a disk carrier in a rotationally fixed manner, which disk carrier is connected to the cage in a rotationally fixed manner with respect to the first axis of rotation, and that the flywheel mass is coupled to the first or the second disks in order to move the first and the second disks relative to each other along the first axis of rotation and into meshing contact. Accordingly, the clutch is designed to convert a movement of the flywheel mass in the radial direction into a movement of the disks in the axial direction, i.e., along the first axis of rotation. In principle, it is possible that the first disks are connected to the respective driven shaft in a fixed manner in the axial direction and the second disks are mounted on the disk carrier to be displaceable in the axial direction, or vice versa. The disk carrier may be realized as part of the cage or as a separate component, which is fastened to the cage.

According to some specific embodiments of the present invention, it may be provided that the clutch has a wedge mechanism having a first wedge, which is coupled to the first or the second disks, and a second wedge, which is mounted on the cage, in particular on the disk carrier, to be displaceable in the radial direction and which abuts against the first wedge, to which the flywheel mass is connected. The first wedge has a contact surface which encloses a first, acute angle with the first axis of rotation, for example an angle in a range between 25 degrees and 80 degrees. The second wedge has a contact surface, which encloses a second, obtuse angle with the axis of rotation, which angle may be, e.g., 180 degrees minus the first angle. If the second wedge is moved outwards in the radial direction by the centrifugal force of the flywheel mass, the contact surfaces slide along each other and the second wedge exerts a pressure force on the first wedge along the first axis of rotation, whereby the second wedge presses the first and the second disks against each other. By adjusting the wedge angle, the transformation of the centrifugal force into the pressure force exerted on the disks may be advantageously adjusted in a simple manner. A further advantage consists in the simple and low-wear design of the clutch.

According to some specific embodiments of the present invention, it may be provided that the flywheel mass is designed as a circle segment. This means that the flywheel mass coupled to the first or second friction arrangement may be a circle segment partially surrounding the first axis of rotation, which facilitates a compact design.

According to some specific embodiments of the present invention, it may be provided that the driven gears and the compensating gear are designed as bevel gears.

According to some specific embodiments of the present invention, it may be provided that the differential has a drive gear, e.g., a bevel gear or a spur gear, which is connected to the mechanical interface of the cage. By way of example, the interface may be a flange or the like, to which the drive gear is fastened.

According to some specific embodiments of the present invention, the drive system may have a central braking device, which is designed to apply a braking torque between the drive motor and the differential. The drive system may therefore be designed without wheel brakes.

According to some specific embodiments of the present invention, it may be provided that the central braking device is designed to apply the braking torque to a drive shaft of the drive motor, to a shaft of the transmission gearing or to the cage of the differential. By way of example, the central braking device may be designed as a friction brake acting on the respective shaft or the cage.

The present invention is explained below with reference to the figures.

DETAILED DESCRIPTION OF EXAMPLE EMBODIMENTS

In the figures, the same reference signs denote equivalent or functionally equivalent components, unless indicated otherwise.

Figure 1:
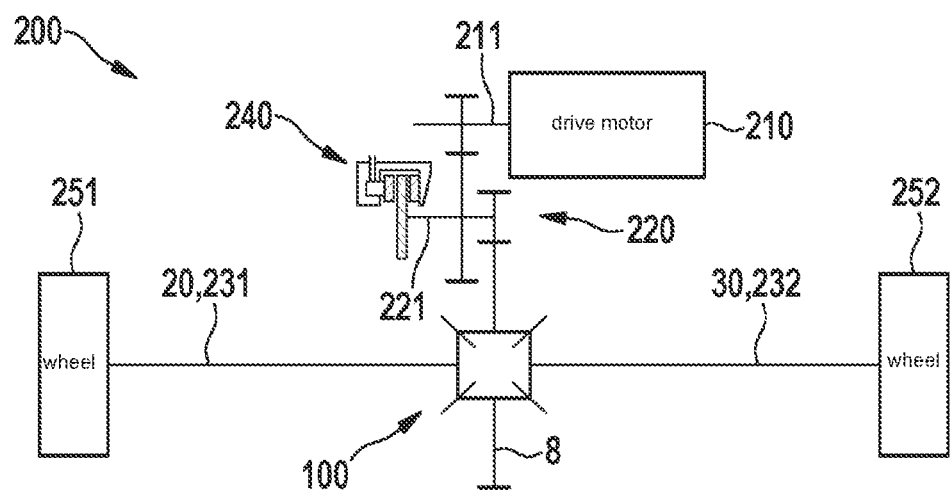
FIG. 1 shows a schematic illustration of a drive system for a vehicle according to an exemplary embodiment of the present invention.

FIG. 1 shows a drive system 200 for a vehicle, e.g., for a car, in a schematic illustration. The drive system 200 has a drive motor 210, e.g., in the form of an electric machine which can be operated as a generator and a motor, a transmission gearing 220, a differential 100, a first axle 231 and a second axle 232. A central braking device 240 may furthermore be optionally provided.

The electric machine may be designed, for example, as a three-phase machine. As illustrated schematically in FIG. 1, a drive shaft 211 of the drive motor 210 is kinematically coupled to the transmission gearing 220. The transmission gearing 220 in FIG. 1 is illustrated merely schematically and purely by way of example and may be designed, for example, as a spur gearing. However, it is also possible that the transmission gearing 220 is realized as a planetary gearing or in another way. The differential 100 is likewise only illustrated schematically in FIG. 1 and will be explained in detail below. The differential 100 is kinematically coupled to the transmission gearing 220 and to the axles 232, 233. The transmission gearing 220 therefore transmits the torque output by the motor 210 to the differential 100, which distributes the torque to the axles 231, 232. It goes without saying that the differential 100 may also pick off torque at the axles 231, 232, which is transmitted to the drive shaft 211 via the gearing 220, e.g., to operate the electric machine as a generator. Each of the axles 231, 232 is designed to be coupled to a respective wheel 251, 252, as illustrated schematically in FIG. 1.

The optional central braking device 240 may be provided instead of wheel brakes, which would apply an individual braking torque to the individual axles 231, 232. The braking device 240 may be designed, for example, as a friction brake, as is illustrated symbolically in FIG. 1. As shown by way of example in FIG. 1, the braking device 240 may be coupled, for example, to a shaft 221, e.g., to an intermediate shaft of the transmission gearing 220, in order to generate a braking torque centrally in the drive system 200. Alternatively, the central braking device 240 might also be coupled to the drive shaft 211 of the drive motor 201 or to a cage 1 (FIGS. 2 to 6) of the differential 100 in order to apply a braking torque there. The central braking device 240 is therefore generally designed to apply a braking torque between the drive motor 210 and the differential 100.

Figure 2:
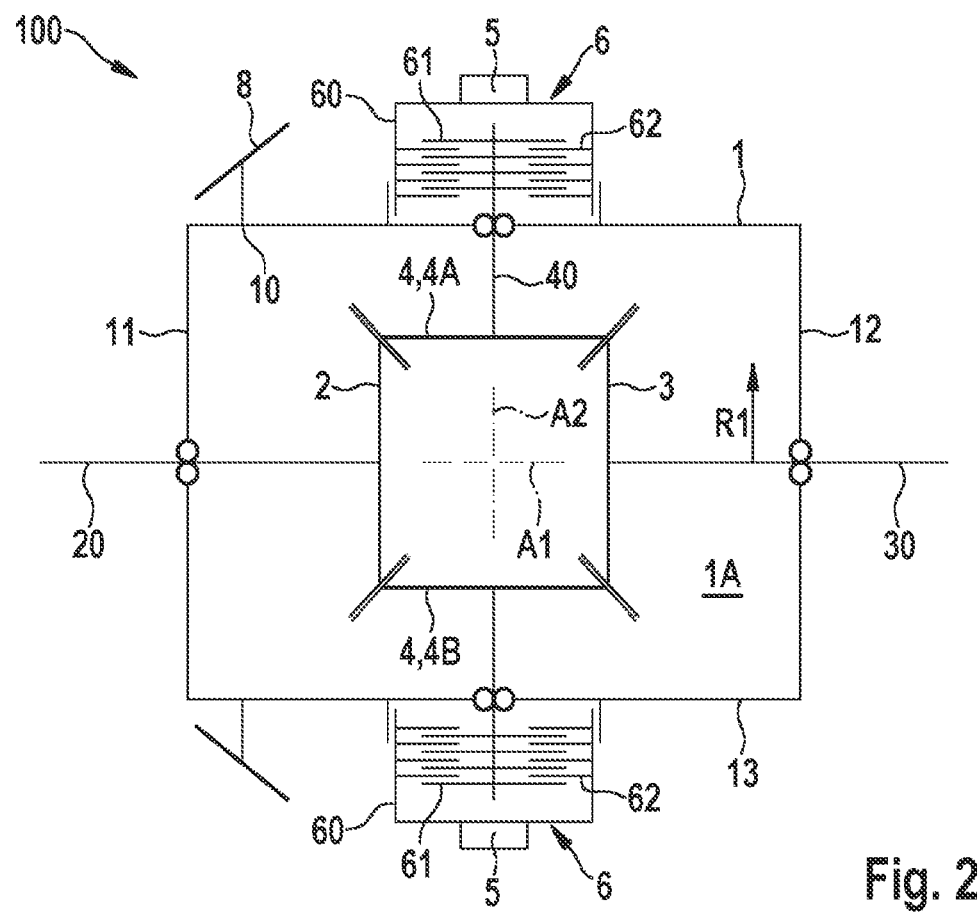
FIG. 2 shows a schematic functional sectional view of a differential according to an exemplary embodiment of the present invention.
Figure 3:
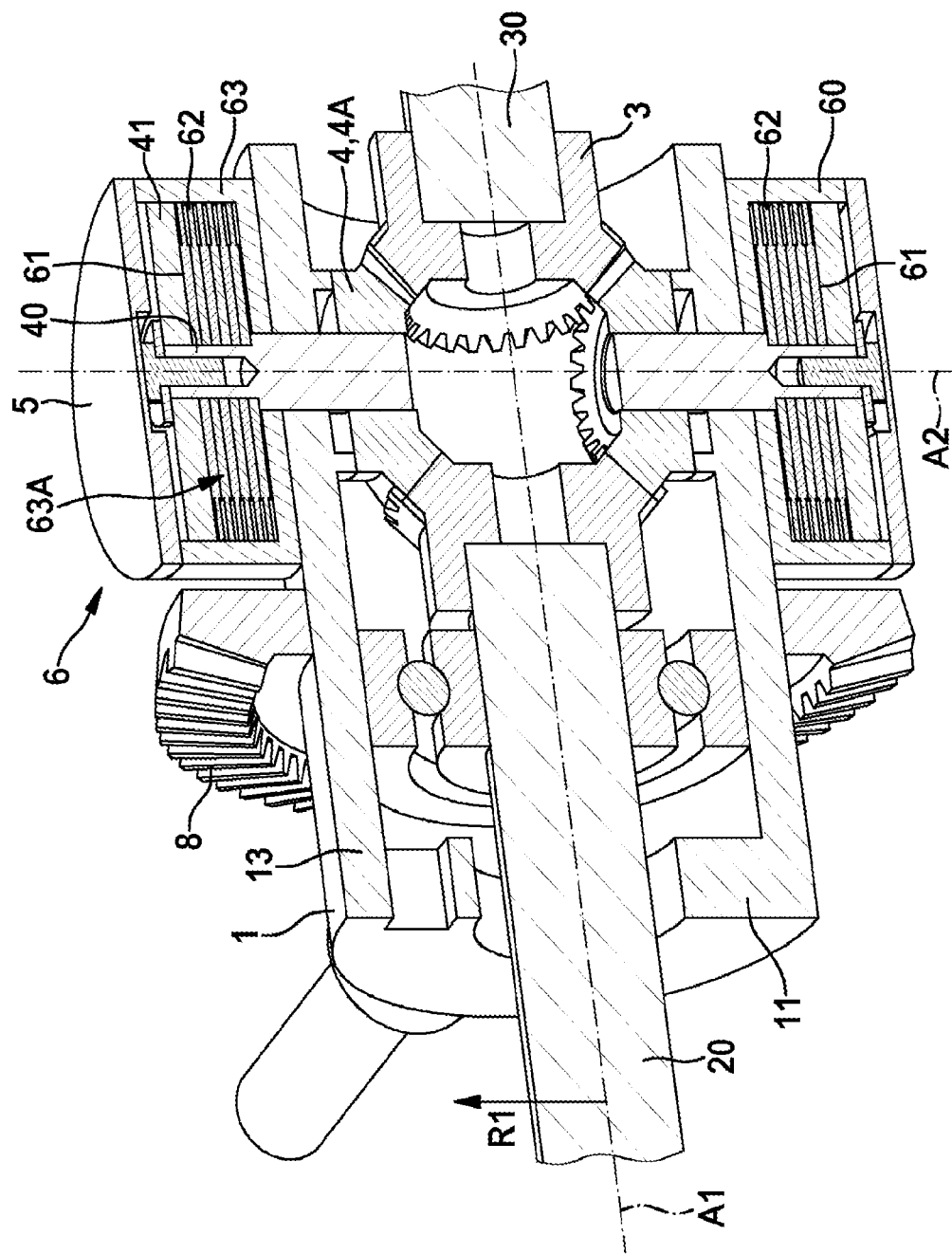
FIG. 3 shows a cut-away perspective sectional view of the differential shown in FIG. 2.
Figure 4:
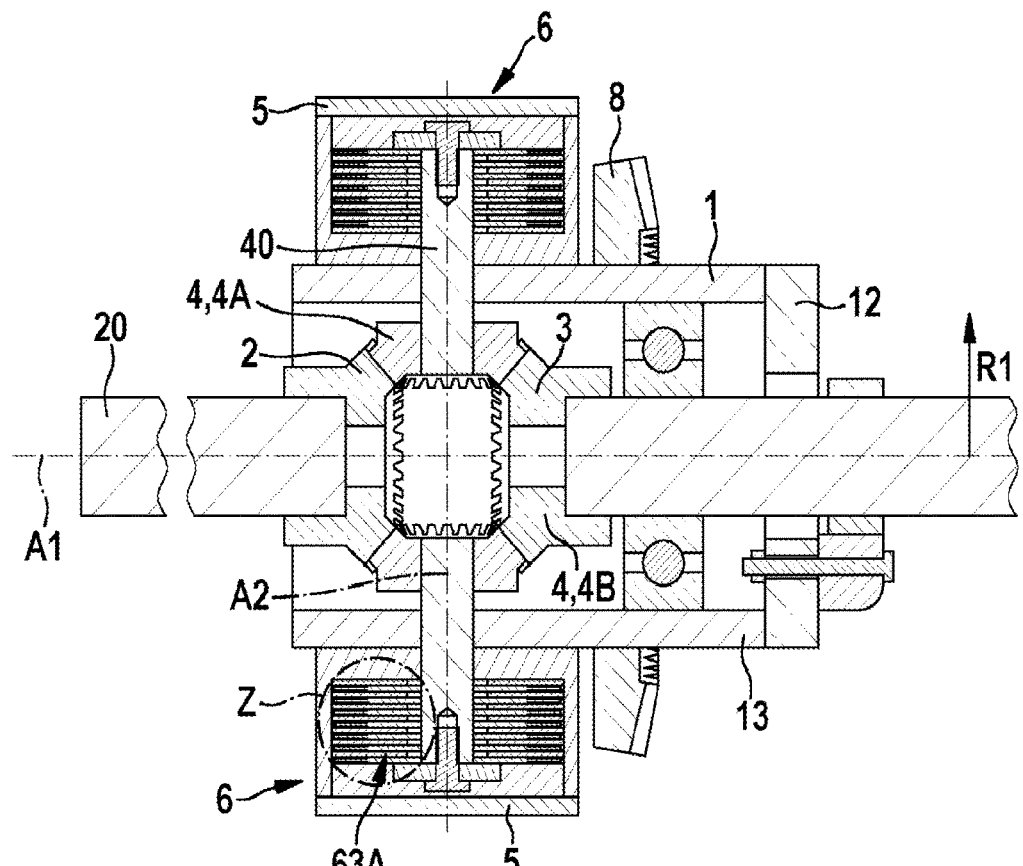
FIG. 4 shows a sectional view of a differential according to a further exemplary embodiment of the present invention.

A differential 100, which may be installed, for example, in the drive system 200 shown in FIG. 1, is illustrated schematically in FIGS. 2 and 3. As shown by way of example in FIGS. 2 and 3, the differential 100 comprises a cage 1, a first output gear 2, a second output gear 3, at least one compensating gear 4, a flywheel mass 5 and a clutch 6.

The cage 1 may have, by way of example, a circumferential wall 13, which may be, for example cylindrical, and mutually opposing end walls 11, 12 provided at the ends of the circumferential wall 13. The circumferential wall 13 and the end walls 11, 12 define an internal space 1A. Other forms of the cage 1 are also possible, e.g., the cage 1 may be realized as a cuboid. In general, the cage 1 may have walls, which define an internal space 1A. The cage 1 is rotatable about a first axis of rotation A1. The end walls 11, 12 are spaced along the first axis of rotation A1 and the circumferential wall 13 surrounds the first axis of rotation A1. The cage 1 furthermore has a mechanical interface or drive interface 10, via which the cage can be coupled to a drive, in particular to the drive motor 210. As shown schematically and purely by way of example in FIGS. 2 and 3, the interface 10 may be formed by a portion of the circumferential wall 13. Alternatively, it would also be possible for a flange, which is connected to the circumferential wall 13 or one of the end walls 11, 12, to form the interface 10. As shown by way of example in FIGS. 2 and 3, a drive gear 8, e.g., a bevel gear, may be connected to the mechanical interface 10. The drive gear 8 can be driven by the motor 210, for example via the transmission gearing 220, in order to rotate the cage 1 about the first axis of rotation A1. In the drive system 200, the cage 1 is therefore coupled to the transmission gearing 220 by its drive interface 10.

The driven gears 2, 3, may be realized, for example, as bevel gears, as is shown by way of example in FIGS. 2 and 3. The driven gears 2, 3 are arranged in the internal space 1A of the cage 1 and may each be connected to a driven shaft 20, 30, which penetrates through the respective end wall 11, 12, and mounted to be rotatable about the first axis of rotation A1. In general, the first and the second driven gear 2, 3 are mounted in the cage 1 to be rotatable about the first axis of rotation A1. The driven shafts 20, 30 may form the first and second axles 231, 232 of the drive system, for example, or be connected thereto. The first axle 231 is therefore generally connected to the first driven gear 2, and the second shaft 232 is generally connected to the second driven gear 3.

As shown by way of example in FIGS. 2 and 3, a first compensating gear 4A and a second compensating gear 4B may be provided. However, it is essentially also possible that only one compensating gear 4 is provided. Therefore, only one compensating gear 4 is described below. The statements apply analogously to the first and the second compensating gear 4A, 4B. As shown by way of example in FIGS. 2 and 3, the compensating gear 4 may be realized as a bevel gear. The compensating gear 4 is arranged in the internal space 1A of the cage 1 and is mounted to be rotatable about a second axis of rotation A2 extending perpendicularly to the first axis of rotation A1. In particular, the compensating gear 4 may be connected to a bearing pin 40, which projects through the circumferential wall 13 of the cage 1 and is rotatably mounted on the circumferential wall 13, as shown by way of example in FIG. 3. As is furthermore shown in FIGS. 2 and 3, the compensating gear 4 meshes with the first and the second driven gear 2, 3.

The flywheel mass 5 is generally realized by one or more components which are connected to the cage 1, in particular in such a way that they are displaceable in a radial direction R1, which extends perpendicularly to the first axis of rotation A1, but are fixed against rotation about the first axis of rotation A1. Upon a rotation of the cage 1 about the first axis of rotation A1, the flywheel mass 5 is therefore moved outwards in the radial direction R1, i.e., away from the axis of rotation A1. The flywheel mass 5 is kinematically coupled to the clutch 6 in order to actuate this latter or to move it between an open state and a locking state. If the flywheel mass 5 is moved outwards in the radial direction R1, the clutch 6 moves into the locking state. The flywheel mass 5 may be optionally pretensioned, e.g., via springs, against an outward movement in the radial direction R1.

As shown by way of example in FIGS. 2 and 3, the clutch 6 may be realized as a multiple disk clutch, which is arranged on the outer circumference or the circumferential wall 13 of the cage 1. In this case, the clutch 6 may be designed to couple the compensating gear 4 to the cage 1 in a rotationally fixed manner with respect to the second axis of rotation A2 in the locking state. As shown by way of example in FIGS. 2 and 3, the clutch 6 may have a first disk set having a multiplicity of first disks 61, a second disk set having a multiplicity of second disks 62 and a disk carrier 60. The disk carrier 60 may be realized, for example, as a closed housing or clutch housing 63. As shown purely by way of example in FIG. 3, the clutch housing 63 may be formed with a cylindrical circumferential wall and a base which is adapted to the outer circumference of the circumferential wall 13. As a result of the cylindrical form of the circumferential wall 13, the clutch housing 63 is positioned on the cage 1 so as to be locked against rotation with respect to the second axis of rotation A2. Alternatively, it is also possible that the disk carrier 60 is coupled to the cage 1 via pins or other guide structures so as to be locked against rotation with respect to the second axis of rotation A2. The flywheel mass 5 may be formed, for example, by the clutch carrier 60 itself. In terms of its measurements, a cover of the clutch housing 53 may be optionally dimensioned according to the desired centrifugal force to be generated. The flywheel mass 5 may generally be connected, in particular fastened, to the disk carrier 60.

As shown by way of example in FIGS. 2 and 3, the bearing pin 40 projects into the internal space 63A of the clutch housing 63. The first disks 61, which may be plate-shaped, for example, are coupled to the bearing pin 40 in a rotationally fixed manner. The second disks 62 are coupled to the disk carrier 60 in a rotationally fixed manner and are arranged to overlap with the first disks 61. First and second disks 61, 62 are therefore arranged in an alternating manner along the second axis of rotation A2, in particular the first and the second disks 61, 62 are arranged in the internal space 63A of the clutch housing 63. The first disks 61 may, for example, be axially displaceably guided on the bearing pin 40, i.e., along the second axis of rotation A2. If the cage 1 rotates about the first axis of rotation A1, the flywheel mass 5 and therefore the disk carrier 60 with the second disks 62 moves outwards in the radial direction R1 so that the second disks 62 come into contact with the first disks 61 or a contact force between the disks 61 increases and a rotation of the compensating gear 4 about the second axis of rotation A2 is therefore inhibited. The first disks 61 maybe be supported, for example, on an end piece 41 mounted at the end of the bearing pin 40 (FIG. 3).

As described, the flywheel mass 5 may be coupled, for example, to the second disks 62. However, it is alternatively also possible that the flywheel mass 5 is coupled to the first disks 61. For example, the first disks 61 may be fixed on a common sleeve, which is guided on the bearing pin 40 so as to be locked against rotation and axially movable. The flywheel mass 5 may, in this case, be connected, for example, to the sleeve and the clutch carrier 60 may be connected to the circumferential wall 13 of the cage 1 in a fixed manner, e.g., screwed thereto or integrally formed with the circumferential wall. In general, the flywheel mass 5 may therefore be coupled to the first or the second disks 61, 62 in such a way as to move the first and the second disks 61, 62 relative to each other along the second axis of rotation A2 and into meshing contact.

If the clutch 6 couples the compensating gear 4 to the cage 1 in a rotationally fixed manner with respect to the second axis of rotation A2 in the locking state, the same torque may be applied to both driven gears 2, 3. Since the flywheel mass 5 is coupled to the cage 1, a locking level of the differential 100 is dependent on the rotational speed of the cage 1, the locking level increasing as the rotational speed increases until, from a predefined rotational speed, the locking state, i.e., a locking level of 100 percent, is achieved.

A dry-running multiple disk clutch is shown by way of example in FIG. 3. A differential 100, which differs from the differential 100 shown in FIG. 3 merely in that the internal space 63A of the clutch housing 63 is filled with a fluid, is shown schematically and purely by way of example in FIGS. 4 and 5. As a result, in addition to a contact friction, which is produced by the direct contact between the disks 61, 62, a viscous friction is achieved due to the fluid. Consequently, the locking level may be optionally additionally varied depending on a rotational speed difference between the driven gears 2, 3, which corresponds to the rotational speed of the compensating gear 4. The fluid may be a dilatant fluid, for example.

Figure 5:
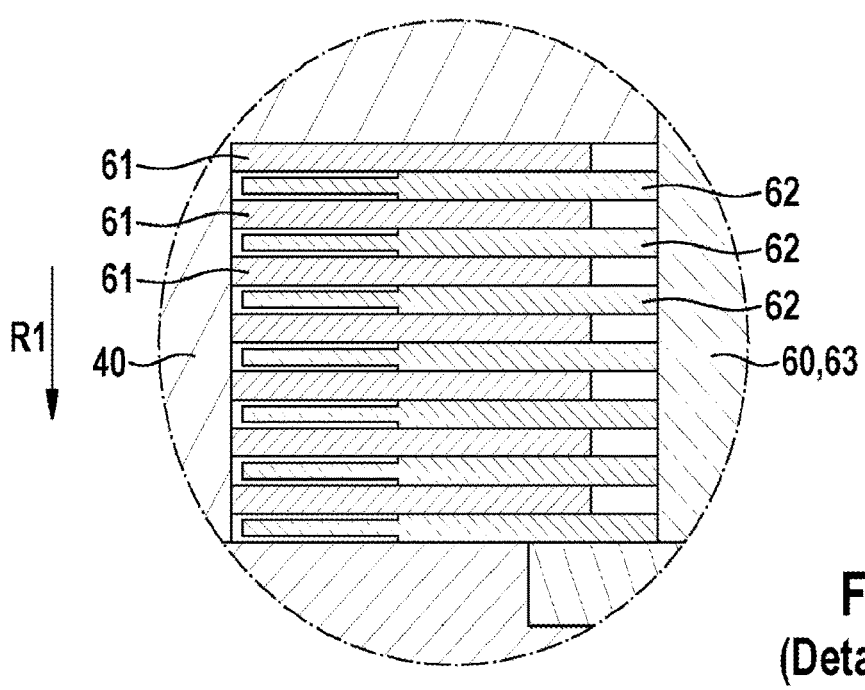
FIG. 5 shows a detailed view of the region of the differential shown in FIG. 4 which is denoted by the letter Z.

As is furthermore shown in FIG. 5, an end region of the second disks 62 may be designed to have a smaller thickness than the rest of the respective disks 62 or to be stepped. Alternatively or in addition, it is also possible that an end region of the first disks 61 is designed to have a smaller thickness than the rest of the respective disks 61 or to be stepped. Viscous friction therefore predominantly acts in the stepped end region, whilst dry friction predominantly determines the characteristics of the clutch 6 in the non-stepped region. Regardless of the configuration of the thickness of the disks 61, 62, it may be provided that the first and/or the second disks 61, 62 are perforated in order to promote, for example, turbulent flows in the fluid and to increase the dependence of the locking level of the differential on the speed difference of the driven gears 2, 3.

Figure 6:
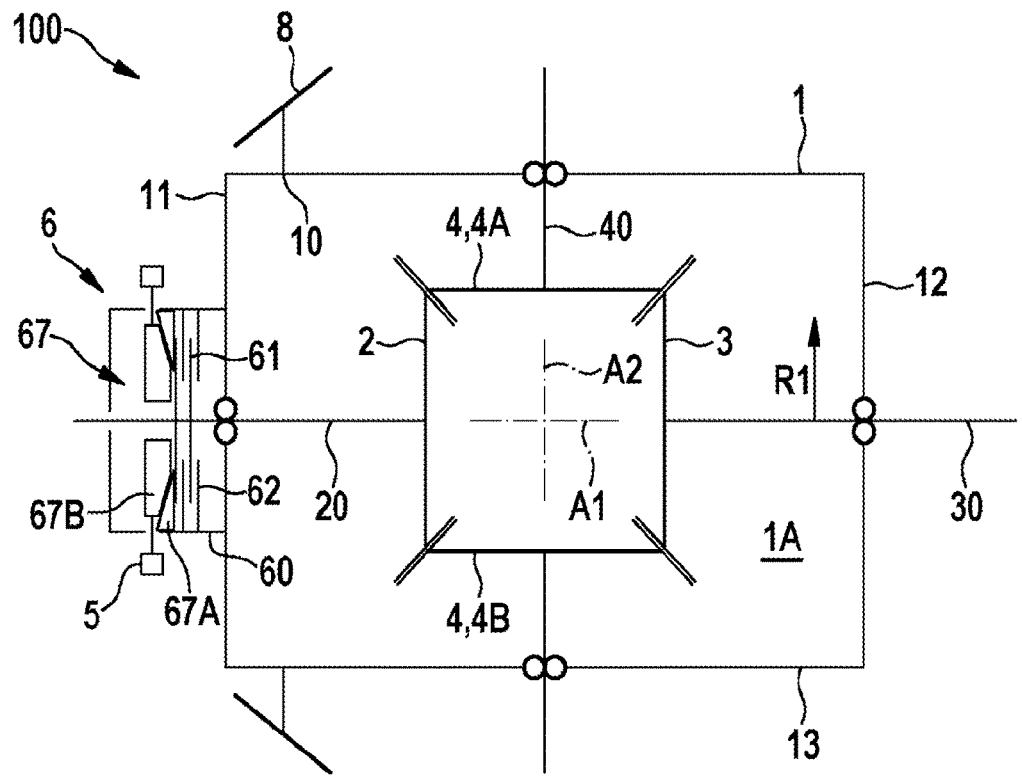
FIG. 6 shows a schematic functional sectional view of a differential according to a further exemplary embodiment of the present invention.

A differential 100, which differs from the differentials 100 shown in FIGS. 2 to 5 in that the clutch 6 does not lock the compensating gear 4 in the locking state but is instead designed to couple one of the driven gears 2, 3 to the cage 1 in a rotationally fixed manner with respect to the first axis of rotation A1 in the locking state, is shown in FIG. 6. In FIG. 6, it is shown by way of example that the clutch 6 acts on the first driven gear 2. It goes without saying that the clutch 6 may also act on the second driven gear 3.

As shown by way of example in FIG. 6, the clutch 6 may be realized as a dry- or wet-running multiple disk clutch, similar to that described above. As illustrated schematically in FIG. 6, the clutch 6 comprises a disk carrier 6, a multiplicity of first disks 61, which are coupled to the first driven shaft 20 in a rotationally fixed manner, and a multiplicity of second disks 62, which overlap with the first disks 61 and are coupled to a disk carrier 60 in a rotationally fixed manner. The disk carrier 60 may be fastened, for example, to the first end wall 11 of the cage 1. In general, the disk carrier 60 is connected to the cage 1 in a rotationally fixed manner with respect to the first axis of rotation A1. As shown schematically in FIG. 6, the driven shaft 20 projects into the disk carrier 60, and preferably through this. The first and second disks 61, 62 are arranged in an alternating manner along the driven shaft 20 or along the first axis of rotation A1. The above statements apply with respect to the configuration of the disks 61, 62. It is both possible that only the first or the second disks 61, 62 are mounted on the driven shaft 20 or on the disk carrier 60 so as to be displaceable along the first axis of rotation A1. Alternatively, both the first and the second disks 61, 62 may also be mounted on the driven shaft 20 or on the disk carrier 60 so as to be displaceable along the first axis of rotation A1.

Figure 7:
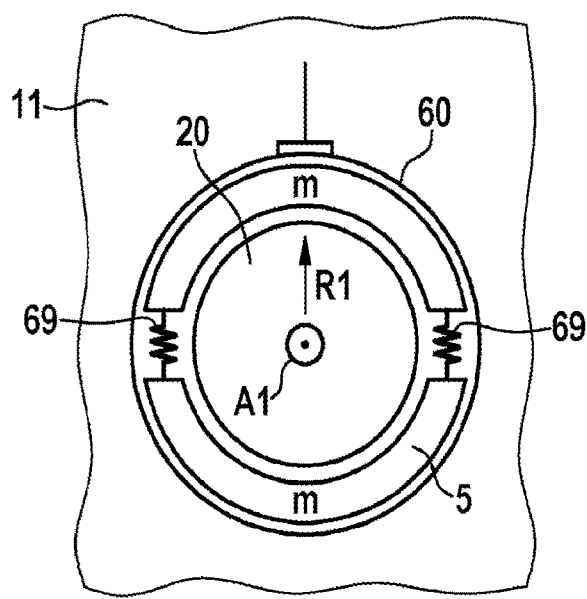
FIG. 7 shows a schematic sectional view of a flywheel mass of a differential according to an exemplary embodiment of the present invention.

The flywheel mass 5 may be formed, for example, by bodies in the form of ring segments, which are mounted on the disk carrier 60 so as to be fixed against rotation about the first axis of rotation A1 and displaceable in the radial direction, as is shown schematically in FIG. 7. As is furthermore shown schematically and purely by way of example in FIG. 7, the flywheel masses 5 may also be pretensioned against a movement in the radial direction R1, e.g., via springs 69. Therefore, the flywheel mass 5 in this differential 100 is also coupled to the cage 1 so as to be locked against rotation with respect to the first axis of rotation A1 and displaceable in the radial direction R1. In FIG. 6, the flywheel mass 5 is illustrated merely symbolically as a block.

As is furthermore illustrated in FIG. 6, the clutch 6 may have a wedge mechanism 67 having a first wedge 67A and a second wedge 67B. The first wedge 67A is coupled to the first or the second disks 61, 62, in particular to the disks 61, 62 of the disk set, which is mounted to be displaceable along the first axis of rotation A1. In FIG. 6, it is shown purely by way of example that the first wedge 67A is coupled to the first disks 61. As shown schematically in FIG. 1, a tip of the first wedge 67A may be positioned facing the first axis of rotation A1 or a contact surface of the first wedge 67A may enclose an acute angle with the first axis of rotation A1. The second wedge 67B is orientated contrary to the first wedge 67A, so that a tip of the second wedge 67B is positioned facing away from the first axis of rotation A1 or a contact surface of the second wedge 67B encloses an acute angle with the first axis of rotation A1. As illustrated schematically in FIG. 6, a contact surface of the second wedge 67B abuts against a contact surface of the first wedge 67A. The flywheel mass 5 is coupled to the second wedge 67B. The second wedge 67B is therefore pulled outwards in the radial direction R1 by the flywheel mass 5 upon a rotation of the cage 1 about the first axis of rotation A1. As a result, the second wedge 67B slides along the first wedge 67A and, due to the inclination of the contact surfaces, exerts a force on the first wedge 67A in the axial direction or along the first axis of rotation A1, which brings the first and the second disks 61, 62 into meshing contact or increases a friction force between the disks 61, 62 according to the axial force.

The present invention is not restricted to a wedge mechanism 67 for actuating the multiple disk clutch 6 shown in FIG. 6. In general, the flywheel mass 5 may be kinematically connected to the clutch 6 and the clutch 6 may be designed to convert a movement of the flywheel mass 5 in the radial direction R1 into a movement of the disks 61, 62 relative to each other in the axial direction, i.e., along the first axis of rotation A1.

Furthermore, the clutch 6 of the differential 100 shown in FIG. 6 is not restricted to a multiple disk clutch. Alternatively, other friction clutches may also be provided, e.g., having a first friction member, which is coupled to the respective driven shaft 20, 30 in a rotationally fixed manner with respect to the first axis of rotation A1, and a second friction member, which is coupled to the cage 1 in a rotationally fixed manner with respect to the first axis of rotation A1 but so as to be displaceable in the radial direction R1. The flywheel mass 5 here is coupled to the second friction member. Upon a rotation of the cage 1 about the first axis of rotation 1, the second is pulled outwards in the radial direction R1 by the flywheel mass 5 and comes into contact with a friction surface of the first friction member, which surrounds the first axis of rotation A1, for example.

In general, the clutch 6 therefore comprises a first friction arrangement, which is coupled to the respective driven shaft 20, 30 in a rotationally fixed manner with respect to the first axis of rotation A1, and a second friction arrangement, which is coupled to the cage 1 in a rotationally fixed manner with respect to the first axis of rotation A1, the flywheel mass 5 being coupled to the first or the second friction arrangement in such a way as to move these relative to each other into meshing contact.

Although the present invention is explained by way of example above with reference to exemplary embodiments, it is not restricted thereto, but may be modified in a variety of ways. In particular, combinations of the above exemplary embodiments are also possible.

What is claimed is:

1. A differential for a vehicle, comprising:
   a cage which is rotatable about a first axis of rotation and has a drive interface for coupling to a drive;
   a first driven gear, which is mounted in the cage to be rotatable about the first axis of rotation;
   a second driven gear, which is mounted in the cage to be rotatable about the first axis of rotation;
   a compensating gear, which is mounted in the cage about a second axis of rotation extending perpendicularly to the first axis of rotation, and which meshes with the first and the second driven gears;
   a flywheel mass, which is coupled to the cage so as to be locked against rotation with respect to the first axis of rotation and is displaceable in a radial direction perpendicularly to the first axis of rotation; and
   a clutch, which, as a result of an outward movement of the flywheel mass in the radial direction, is movable into a locking state in which the clutch couples the compensating gear to the cage in a rotationally fixed manner with respect to the second axis of rotation or couples one of the first and second driven gears to the cage in a rotationally fixed manner with respect to the first axis of rotation, wherein the clutch is configured to couple the compensating gear to the cage in a rotationally fixed manner with respect to the second axis of rotation in the locking state, the compensating gear being mounted on the cage via a bearing pin so as to be rotatable about the second axis of rotation, the bearing pin projecting through a circumferential wall of the cage, the clutch having a multiplicity of first disks, which are coupled to the bearing pin in a rotationally fixed manner, and a multiplicity of second disks, which overlap with the first disks and are coupled to a disk carrier connected to the cage in a rotationally fixed manner with respect to the second axis of rotation, and the flywheel mass being coupled to the first disks or the second disks in order to move the first disks and the second disks relative to each other along the second axis of rotation and into meshing contact.

2. The differential as recited in claim 1, wherein the flywheel mass is fastened to the disk carrier.

3. The differential as recited in claim 1, wherein the disk carrier is formed by a clutch housing, which defines an internal space, the first and the second disks being arranged in the internal space.

4. The differential as recited in claim 3, wherein the internal space is filled with a dilatant fluid.

5. The differential as recited in claim 1, wherein the clutch is configured to couple a driven gear of the first and second driven gears to the cage in a rotationally fixed manner with respect to the first axis of rotation in the locking state, the driven gear being mounted on the cage via a driven shaft so as to be rotatable about the first axis of rotation, the driven shaft projecting through an end wall of the cage, the clutch having a first friction arrangement, which is coupled to the driven shaft in a rotationally fixed manner with respect to the first axis of rotation, and a second friction arrangement, which is coupled to the cage in a rotationally fixed manner with respect to the first axis of rotation, the flywheel mass being coupled to the first friction arrangement or the second friction arrangement to move the first and second friction arrangements relative to each other into meshing contact.

6. A differential for a vehicle, comprising:
a cage which is rotatable about a first axis of rotation and has a drive interface for coupling to a drive;
a first driven gear, which is mounted in the cage to be rotatable about the first axis of rotation;
a second driven gear, which is mounted in the cage to be rotatable about the first axis of rotation;
a compensating gear, which is mounted in the cage about a second axis of rotation extending perpendicularly to the first axis of rotation, and which meshes with the first and the second driven gears;
a flywheel mass, which is coupled to the cage so as to be locked against rotation with respect to the first axis of rotation and is displaceable in a radial direction perpendicularly to the first axis of rotation; and
a clutch, which, as a result of an outward movement of the flywheel mass in the radial direction, is movable into a locking state in which the clutch couples the compensating gear to the cage in a rotationally fixed manner with respect to the second axis of rotation or couples one of the first and second driven gears to the cage in a rotationally fixed manner with respect to the first axis of rotation, wherein the clutch is configured to couple a driven gear of the first and second driven gears to the cage in a rotationally fixed manner with respect to the first axis of rotation in the locking state, the driven gear being mounted on the cage via a driven shaft so as to be rotatable about the first axis of rotation, the driven shaft projecting through an end wall of the cage, the clutch having a first friction arrangement, which is coupled to the driven shaft in a rotationally fixed manner with respect to the first axis of rotation, and a second friction arrangement, which is coupled to the cage in a rotationally fixed manner with respect to the first axis of rotation, the flywheel mass being coupled to the first friction arrangement or the second friction arrangement to move the first and second friction arrangements relative to each other into meshing contact, wherein the first friction arrangement has a multiplicity of first disks, which are coupled to the driven shaft in a rotationally fixed manner, wherein the second friction arrangement has a multiplicity of second disks, which overlap with the first disks and are coupled to a disk carrier in a rotationally fixed manner, the disk carrier being connected to the cage in a rotationally fixed manner with respect to the first axis of rotation, and wherein the flywheel mass is coupled to the first or the second disks in order to move the first and the second disks relative to each other along the first axis of rotation and into meshing contact.

7. The differential as recited in claim 6, wherein the clutch has a wedge mechanism having a first wedge, which is coupled to the first or the second disks, and a second wedge, which is mounted on the disk carrier, so as to be displaceable in the radial direction and which abuts against the first wedge, to which the flywheel mass is connected.

8. A differential for a vehicle, comprising:
a cage which is rotatable about a first axis of rotation and has a drive interface for coupling to a drive;
a first driven gear, which is mounted in the cage to be rotatable about the first axis of rotation;
a second driven gear, which is mounted in the cage to be rotatable about the first axis of rotation;
a compensating gear, which is mounted in the cage about a second axis of rotation extending perpendicularly to the first axis of rotation, and which meshes with the first and the second driven gears;
a flywheel mass, which is coupled to the cage so as to be locked against rotation with respect to the first axis of rotation and is displaceable in a radial direction perpendicularly to the first axis of rotation; and
a clutch, which, as a result of an outward movement of the flywheel mass in the radial direction, is movable into a locking state in which the clutch couples the compensating gear to the cage in a rotationally fixed manner with respect to the second axis of rotation or couples one of the first and second driven gears to the cage in a rotationally fixed manner with respect to the first axis of rotation, wherein the clutch is configured to couple a driven gear of the first and second driven gears to the cage in a rotationally fixed manner with respect to the first axis of rotation in the locking state, the driven gear being mounted on the cage via a driven shaft so as to be rotatable about the first axis of rotation, the driven shaft projecting through an end wall of the cage, the clutch having a first friction arrangement, which is coupled to the driven shaft in a rotationally fixed manner with respect to the first axis of rotation, and a second friction arrangement, which is coupled to the cage in a rotationally fixed manner with respect to the first axis of rotation, the flywheel mass being coupled to the first friction arrangement or the second friction arrangement to move the first and second friction arrangements relative to each other into meshing contact, wherein the flywheel mass is configured as a circle segment.

9. A drive system for a vehicle, comprising:
a drive motor in the form of an electric machine;
a transmission gearing coupled to the drive motor;
a differential, including:
a cage which is rotatable about a first axis of rotation and has a drive interface for coupling to a drive,
a first driven gear, which is mounted in the cage to be rotatable about the first axis of rotation,
a second driven gear, which is mounted in the cage to be rotatable about the first axis of rotation,
a compensating gear, which is mounted in the cage about a second axis of rotation extending perpendicularly to the first axis of rotation, and which meshes with the first and the second driven gears,
a flywheel mass, which is coupled to the cage so as to be locked against rotation with respect to the first axis of rotation and is displaceable in a radial direction perpendicularly to the first axis of rotation, and
a clutch, which, as a result of an outward movement of the flywheel mass in the radial direction, is movable into a locking state in which the clutch couples the compensating gear to the cage in a rotationally fixed manner with respect to the second axis of rotation or couples one of the first and second driven gears to the cage in a rotationally fixed manner with respect to the first axis of rotation,
wherein the cage is coupled to the transmission gearing via these drive interface;
a first axle connected to the first driven gear of the differential; and
a second axle connected to the second first driven gear of the differential, wherein the clutch is configured to couple the compensating gear to the cage in a rotationally fixed manner with respect to the second axis of rotation in the locking state, the compensating gear being mounted on the cage via a bearing pin so as to be rotatable about the second axis of rotation, the bearing pin projecting through a circumferential wall of the cage, the clutch having a multiplicity of first disks, which are coupled to the bearing pin in a rotationally fixed manner, and a multiplicity of second disks, which overlap with the first disks and are coupled to a disk carrier connected to the cage in a rotationally fixed manner with respect to the second axis of rotation, and the flywheel mass being coupled to the first disks or the second disks in order to move the first disks and the second disks relative to each other along the second axis of rotation and into meshing contact.

10. The drive system as recited in claim 9, further comprising:
a central braking device, which is configured to apply a braking torque between the drive motor and the differential.

11. The drive system as recited in claim 10, wherein the central braking device is configured to apply the braking torque to a drive shaft of the drive motor, or to a shaft of the transmission gearing, or to the cage of the differential.

* * * * *